United States Patent [19]
Stehr

[11] Patent Number: 4,955,934
[45] Date of Patent: Sep. 11, 1990

[54] MEASURING DEVICE WITH A TEST TAPE CASSETTE

[76] Inventor: Werner Stehr, Nordstetter Str. 26, 7240 Horb-Ahldorf, Fed. Rep. of Germany

[21] Appl. No.: 346,796

[22] Filed: May 3, 1989

[30] Foreign Application Priority Data

May 13, 1988 [DE] Fed. Rep. of Germany ....... 3816353

[51] Int. Cl.$^5$ ................................ G01L 3/14; G01L 5/00
[52] U.S. Cl. ............................. 73/862.340; 73/862.440
[58] Field of Search ........... 73/862.33, 862.34, 862.08, 73/862.44

[56] References Cited

U.S. PATENT DOCUMENTS 3,771,358 11/1973 Yamano ..................... 73/862.44 X
4,347,748 9/1982 Pierson ........................ 73/862.34

FOREIGN PATENT DOCUMENTS 2122760 1/1984 United Kingdom ............ 73/862.44

Primary Examiner—Charles A. Ruehl
Attorney, Agent, or Firm—Bachman & LaPointe

[57] ABSTRACT

A measuring device with a test tape cassette, in which sensors are placed on the tape spools comprising a hub and a spool body arranged in rotary manner with respect to the hub, which determine the angular displacement between hub and spool body in conjunction with a test circuit and display same as a measure of the torque acting on the tape spools. The hub and spool body are interconnected in per se known manner by means of a spring element. Preferably the test tape cassette has a printed circuit board as the upper cover, on which are located the sensors and the necessary electrical lines.

8 Claims, 3 Drawing Sheets

MEASURING DEVICE WITH A TEST TAPE CASSETTE

BACKGROUND OF THE INVENTION

The invention relates to a measuring device with a test tape cassette for measuring the torque occurring on the hubs of the two tape spools.

Test tape cassettes are known, whose tape spools comprise a hub and a spool body, which are rotatably reciprocally mounted by means of a ball bearing collar and a spring element acts between the hub and the spool body. If the hub is now driven by the driving cam of a tape recorder, the torque acting on the hub rotates the latter with respect to the outer spool body and thereby tensions the spring element. The angular displacement between hub and spool body brings about a corresponding tensioning of the spring element, so that the angular displacement is a measure of the torque acting on the hub. In the case of the known test tape cassettes, the tape spools carry a scale on which the acting torque can be read off a marking system as a function of the angular displacement between the hub and the spool body. Therefore the scale is in joules and not in radians.

Such test tape cassettes are used for determining the torque, which is transmitted by the slip clutch of the driving cam. In order to achieve uniform tape running, the slip clutch should cause no torque fluctuations. Therefore the slip clutch quality can be checked by a continuous torque measurement. In the case of conventional test tape cassettes, it is not possible to determine the torque in closed tape recorders, e.g. in the cassette part of car radio or other built-in equipment, because the torque must be directly read off the top of the test tape cassette. Therefore it is scarcely possible to observe torque fluctuations with this visual measurement system.

SUMMARY OF THE INVENTION

The problem of the present invention is to provide a measuring device with a test tape cassette, which also permits a measurement of the torque occurring on the hub in a closed tape recorder casing.

According to the invention this problem is solved and there is provided a measuring device with a test tape cassette for measuring the torque occurring on the hubs of the two tape spools, in which the hubs are rotatable against the action of a spring with respect to the spool bodies and having markings on the hubs and spool bodies, characterized in that the rotation angle between the marking of a hub and the associated spool body is established by means of sensors as a measure for the torque, said sensors being connected by means of electric lines or optical fibers to a test circuit located outside the test tape cassette. The test signals can be passed on by means of thin flat cables to a test circuit. The flat cables can be led out of the tape recorder through the cassette insertion opening or at some other point. The use of an electronic angle-measuring instrument also permits a continuous monitoring of the torque flow and this is indicated by means of electrical recorders or indicators.

According to the preferred embodiment of the invention, the sensors are arranged on a printed circuit board forming the top or bottom of the test tape cassette. This measure makes it possible to make the external dimensions of the test tape cassette such that said dimensions coincide with those of a conventional tape cassette. Thus, the test tape cassette can be inserted without difficulty in any tape recorder.

The sensors can be photodiodes, inductive or capacitive transducers, which cooperate with correspondingly constructed optical, inductive or capacitive markings. When using photodiodes, light/dark markings can be provided on the hub and spool body, the sensors with the associated light sources can be positioned directly over the markings. The photodiodes and light sources together form a light barrier, which can operate in the infrared range and is independent of external lighting sources.

On the hub and spool body can be provided several markings, line patterns or the like, in order to obtain a very accurate measurement of the speed and angular displacement for determining the torque.

The spring elements located between the hub and the spool body can be constituted by a spiral spring, helical spring or torsion spring element, particularly little space being taken up by a spiral spring constructed as a thin spring wire.

The test pulses supplied by the sensors arranged on the hub and spool body are a measure of the speed and angular displacement between the hub and spool body. A torque-proportional quantity is derived from these signals in the test circuit and is displayed in a correspondingly standardized or calibrated display system.

BRIEF DESCRIPTION OF THE DRAWINGS

The invention is described in greater detail hereinafter relative to the accompanying drawings described below.

DETAILED DESCRIPTION

Figure 1:
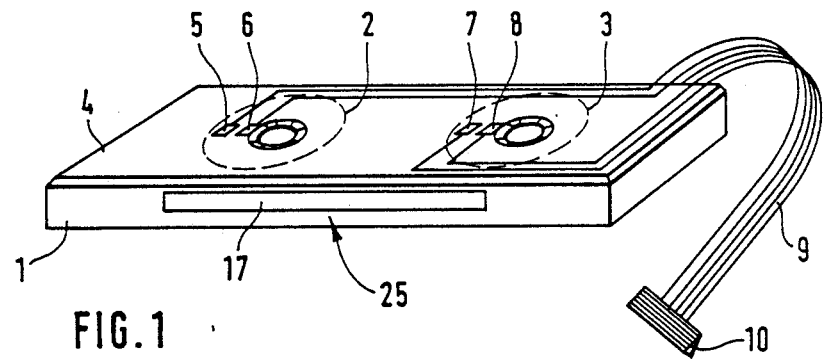
FIG. 1: A highly simplified, perspective view of the inventive test tape cassette.

The test tape cassette 1 shown in FIG. 1 contains two tape spools 2, 3 indicated in broken line form. The top of the test tape cassette 1 is formed by a mounting plate 4 on which are located the sensors 5 to 8. Sensors 5 to 8 are connected by means of electric lines to a flat cable 9 passing out of the back and which leads to a plug 10. By means of plug 10 the test tape cassette 1 can be connected to a test circuit, so that the power supply for sensors 5 to 8 and their test signals can be transmitted via the flat cable 9.

Figure 2:
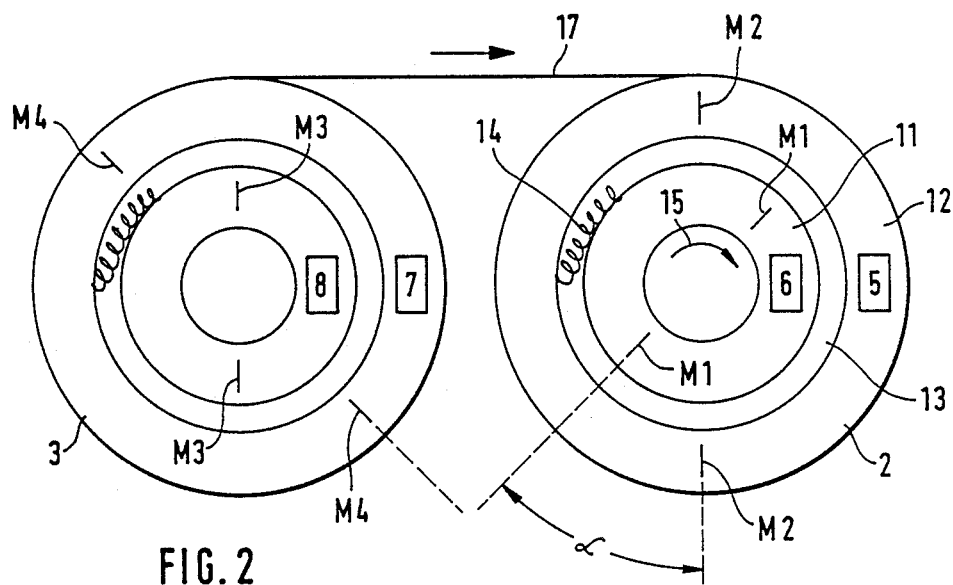
FIG. 2: The basic construction of tape spools with sensors.
Figure 4:
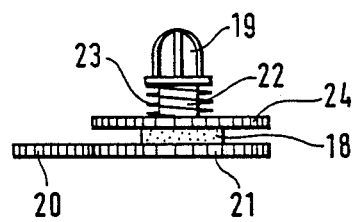
FIG. 4: A side view of a driving cam with slip clutch.

FIG. 2 shows the basic construction of the test tape cassette. Each of the two tape spools 2, 3 comprises a hub 11 and a spool body 12, which are rotatably interconnected by means of an interposed annular ball bearing 13. One end of a spring element 14 is fixed to the hub 11 and its other end is fixed to the spool body 12. If the hub 11 is now driven by means of a driving cam, as shown in FIG. 4, in the direction of arrow 15, the resulting torque leads to hub 11 being displaced by an angle $\alpha$ with respect to the spool body 12 and thereby tensions the spring element 14. The spring acting tangentially between hub 11 and spool body 12 causes an opposing torque. Angle α between markings M1, M2 constantly provides a measure of the torque acting on hub 11.

On rotating the tape spool 2, two sensors 5, 6 make it possible to determine a time interval between markings M1, M2, as well as the time for one revolution. Sensors 5, 6 in each case supply a test pulse if the associated marking M2 or M1 moves through beneath them. In the represented embodiment there are two similar markings displaced by 180° on hub 11 and spool body 12.

Corresponding markings M3, M4 are provided for the tape spool 3 and correspondingly cooperate in conjunction with sensors 7, 8.

Figure 3:
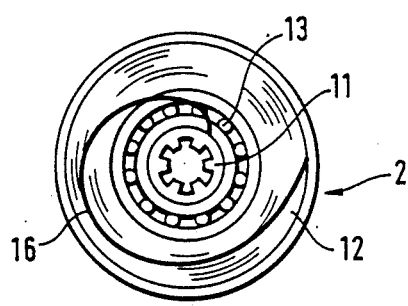
FIG. 3: An embodiment of a tape spool with spiral spring.

FIG. 3 shows a tape spool 2, which has a spiral spring 16 acting between hub 11 and spool body 12. Tape 17 (FIGS. 1 and 2) is wound onto the circumferential surface of spool body 12.

FIG. 4 shows the principle of a driving cam 19 driven by means of a slip clutch 18. A first gear 20 drives a second gear 21, which is connected in frictionally engaging manner via clutch 18 to the shaft 22 of driving cam 19. A compression spring 23 presses the slip clutch 18 against gear 21. A further gear 24 can be linked with test gears for monitoring the speed and synchronism.

As the tape reel located on the tape spools in the case of tape cassettes assumes different diameters, it must be ensured that for each, even small diameter the spool rotates sufficiently rapidly to ensure that tape 17 is appropriately wound up. Tape 17 is conventionally drawn past a sound head by means of a not shown driving shaft, in conjunction with a counterpressure roll and at a constant speed. The drive and sound head are located in the vicinity of end face 25 (FIG. 1), where it is possible to see tape 17.

Figure 5:
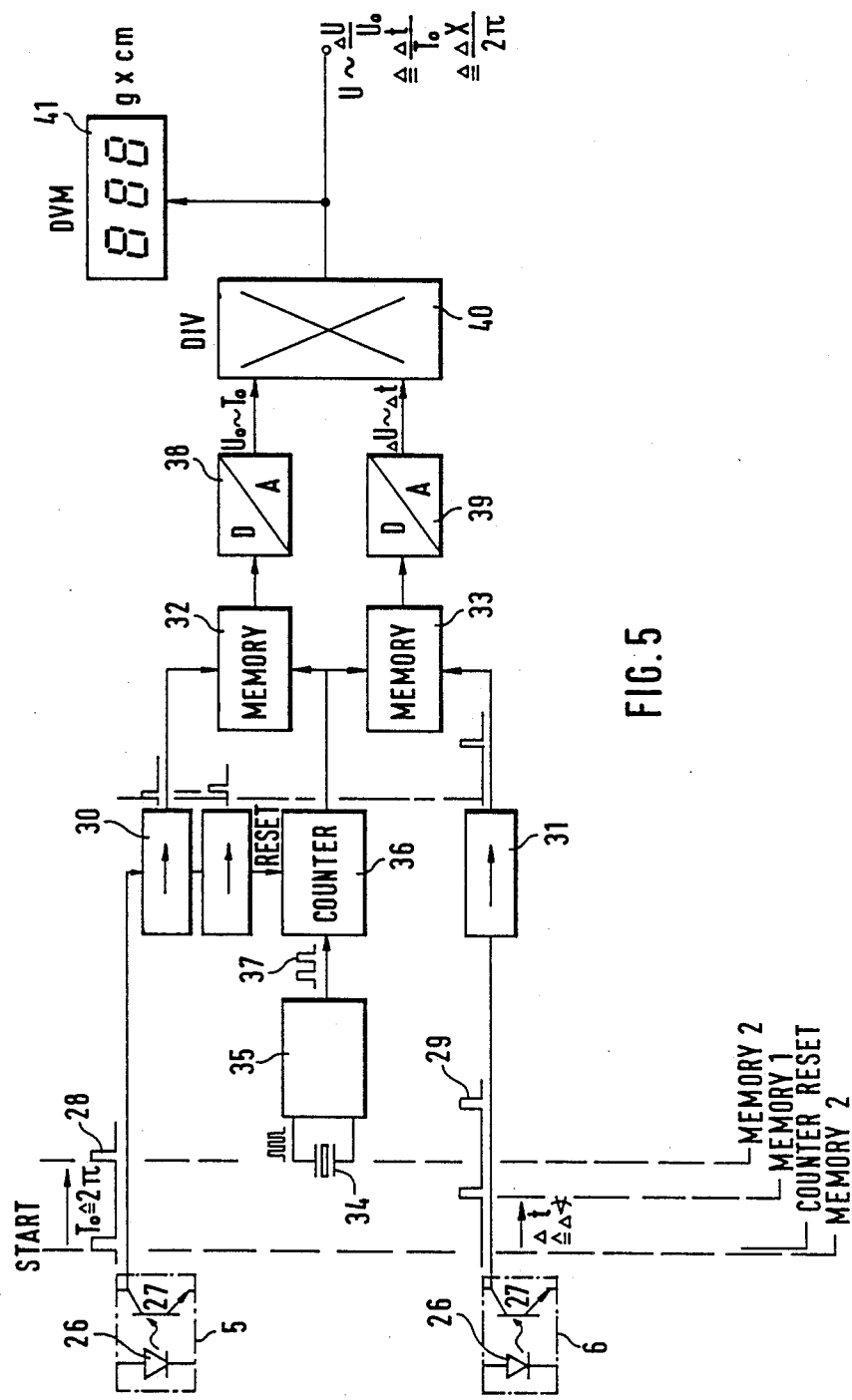
FIG. 5: The electric block circuit diagram of the measuring device.

FIG. 5 is the block circuit diagram of the measuring device. Sensors 5, 6 comprise a light-emitting diode 26 and a phototransistor 27. If a marking M1, M2 reaches sensors 5, 6, then test pulses 28, 29 are produced, which are transmitted by means of toggle switches 30, 31 to memories 32, 33 in the form of strobe signals.

The time base is produced by a crystal 34 in conjunction with a divider 35. A counter 36 counts the time pulses 37. The counter reading is in each case strobed by corresponding strobe pulses into memories 32, 33 and periodically reset. The counter reading contained in memory 32 corresponds to the time between the occurrence of two identical markings M2, whilst the counter reading in memory 33 corresponds to the time between the occurrence of markings M1 and M2. Two digital-analog converters 38, 39 covert the stored values into analog voltage values $U_O$ and $\Delta U$, which are proportional to the period $T_O$ or time displacement $\Delta t$. On the output side a divider 40 supplies the test voltage U, which is supplied to a digital voltmeter 41 and represents the voltage ratio $\Delta U/U_O$, constituting a measure for the torque in g×cm.

In place of optical sensors, it is possible to use inductive or capacitive sensors. The markings can then be made from a material, which acts magnetically or capacitively.

Figure 7:
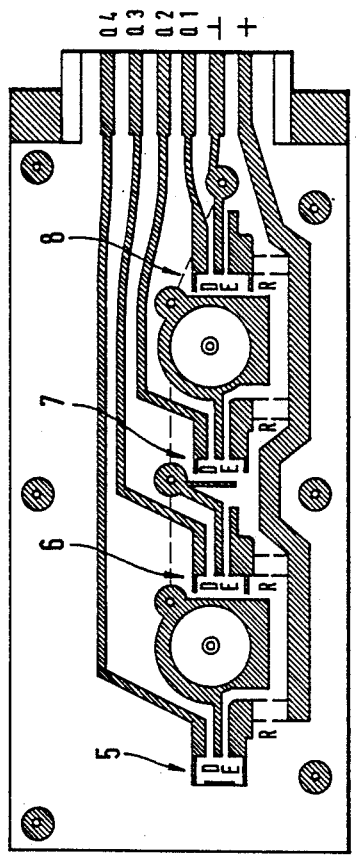
FIG. 7: A plan view of a plate forming the top of the test tape cassette.
Figure 6:
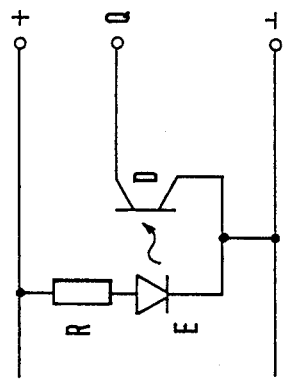
FIG. 6: The electric circuit diagram for the sensors used.

FIG. 6 shows the electric circuit for one of the four sensors 5 to 8 used and which according to FIG. 7 can be placed on a plate. Compared with the embodiment according to FIGS. 1 and 2, the embodiment of FIG. 7 provides for a change to the position of sensors 5 to 8. However, the function is the same, because two sensors 5, 6 or 7, 8 are associated with each audio tape spool.

The circuit shown in FIG. 6 has a light-emitting diode E, whose anode is applied to a positive voltage across a resistor R, whilst the cathode of the light-emitting diode E is earthed. A photosensitive transistor D connected as a diode is used as the actual sensor element and its signal line leads to an output Q. Thus, at output Q, the test signal can be transmitted via plug 10 (FIG. 1) to a test circuit.

The three components used in the sensor circuit according to FIG. 6 can be fitted in per se known manner to the plate shown in FIG. 7 and electrically conductively connected to the conductor lines. The electrical components can be constructed as surface mounted devices.

I claim:

1. Measuring device with a test tape cassette for measuring the torque occurring on the hubs of the two tape spools, in which the hubs are rotatable against the action of a spring with respect to the spool bodies and having markings on the hubs and spool bodies, wherein the rotation angle between the markings of a hub and the associated spool body is established by means of sensors as a measure for the torque, said sensors being connected by connecting means to a test circuit located outside the test tape cassette, wherein the sensors are positioned on a printed circuit board, which forms a surface of the test tape cassette.

2. Measuring device according to claim 1 wherein a flat cable leads from the printed circuit board to a multi-pole plug which can be connected to the test circuit.

3. Measuring device according to claim 1 wherein the sensors are photodiodes.

4. Measuring device according to claim 3 wherein lighting sources are associated with the photodiodes.

5. Measuring device according to claim 1 wherein several markings in each case displaced by clearly defined angles are located on each hub and on the associated spool body.

6. Measuring device according to claim 1 wherein each spring is a spiral spring.

7. Measuring device according to claim 1 wherein each spring is a helical spring.

8. Measuring device according to claim 1 wherein the sensors supply test pulses and wherein the test pulses supplied by the sensors represent the speed of said tape spools and the time lag between the markings of a hub and the associated spool body and from this in the test circuit is determined the angular displacement between each hub and the associated spool body and therefore the torque acting on each hub.

* * * * *